T. K. ANDERSON.
Stove Pipe Thimble.
No. 4,098. Reissued Aug. 16, 1870.
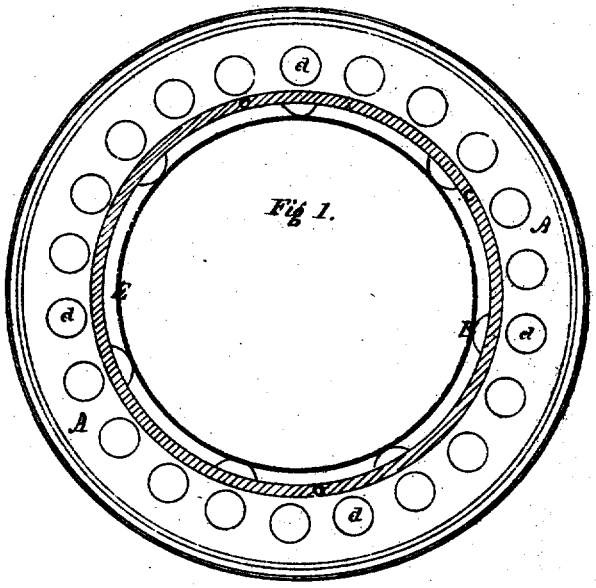
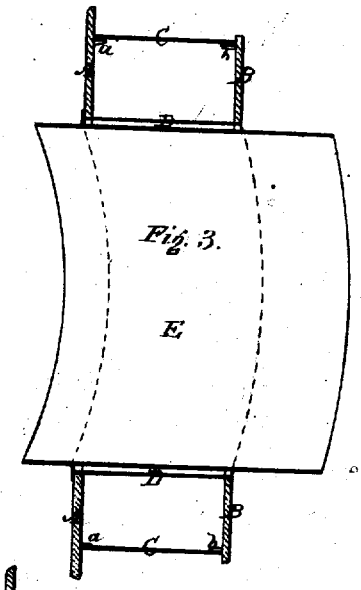
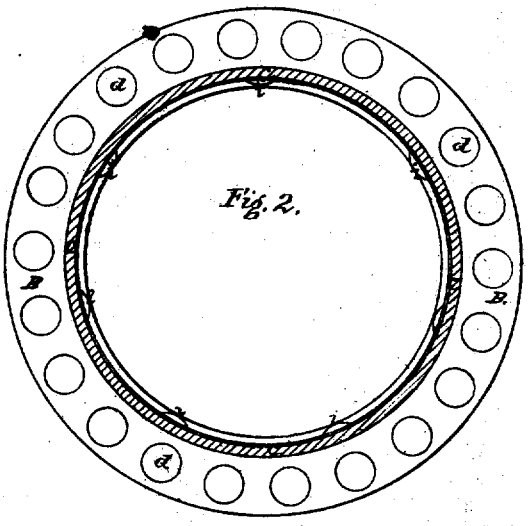
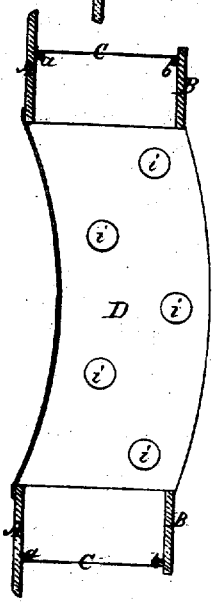
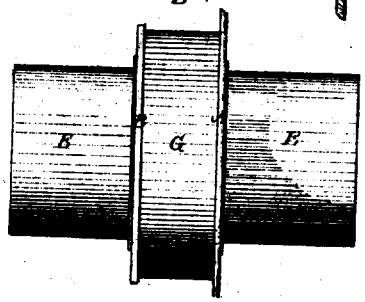
Witnesses
R. F. Lyter
H. A. Dennison
Inventor
Thomas K. Anderson
By Attys. J. B. Woodruff & Son
N. PETERS, Photo-Lithographer, Washington, D. C.

UNITED STATES PATENT OFFICE.

THOMAS K. ANDERSON, OF HORNELLSVILLE, NEW YORK.

STOVE-PIPE THIMBLE.

Specification forming part of Letters Patent No. 41,592, dated February 16, 1864; Reissue No. 4,098, dated August 16, 1870.

*To all whom it may concern:*

Be it known that I, THOMAS K. ANDERSON, of Hornellsville, in the county of Steuben and State of New York, have invented certain new and useful Improvements in Stove-Pipe Thimbles, and the mode of constructing the same, to protect wood partitions from the heat and the danger of taking fire from stove-pipes; and the following is a full, clear, and exact description of the same, reference being had to the accompanying drawings, making a part of this specification, in which—

Figure 1 represents the broad-flanged cap, front face view of the thimble, with an end view of stove-pipe E E. Fig. 2 shows the rear side view of narrow flange of the same. Fig. 3 shows a section across the thimble with a piece of stove-pipe in. Fig. 4 is a view of the same without pipe. Fig. 5 represents an edge view of the thimble with stove-pipe through it.

The object of my invention is to supply a simple, cheap, and perfectly safe stove-pipe thimble, or bush for holding in place a pipe where it passes through a partition or the ceiling and floor to an upper room; and my invention consists in the construction and use of the indented tin or zinc inner cylinder, forming protuberances to impinge against the stove-pipe, and the construction of the metal caps or rings for the wall-faces, and the manner of securing the two caps or faces together by the bending or clinching of the edges of the inner cylinder over the edges of the caps, thereby securing the parts firmly together.

I make my caps or rings A A and B B of cast metal, with small ribs or flanges *a a* and *b b* projecting from the inside, near the outer edge, or at a suitable place to support the rim or outside cylinder C C, which may be made of sheet tin, zinc, or other bright plate metal.

The inner rim or cylinder D D may be made of like material, the surface being indented with a spherical punch from the inside, so as to form a series of convex protuberances, *i i i i i*, to impinge against the stove-pipe E, so as to hold it firmly in the center of the thimble.

The rings or caps A and B may be cast with a series of small holes, *d d d*, through which a current of air will constantly be passing, thereby expelling the heated or rarefied air, so as to keep the metal forming the thimble cool, or at so low a degree of temperature that no wood or anything coming in contact with it will ignite or even char.

The caps A and B may be cast out of any suitable metal, of any ornamental design or configuration, and of such dimensions as to suit the various sizes of stove-pipe. The sheet metal forming the cylinders C and D may be of such width as to suit the various thicknesses of the partitions, the edges of the outside cylinder C coming in between the caps A and B, and is supported against the flanges *a* and *b*, while the inner cylinder D is enough wider to cover the thickness of the inner edges of the rims or caps A B and bend over and clinch on them, which effectually secures all of the parts together, making a light, strong, safe, and efficient stove-pipe thimble.

When it is desirable to have the opening for a stove-pipe through the wall or partition, or through the ceiling and floor, covered and finished by the cap A on both sides, the smaller rim or cap B may be dispensed with, and two of the finishing-caps A used, one of them left so as to be taken off to insert the thimble in its place; then put on the cap, and the inner cylinder D is turned over and clinched, the edges being hammered down smoothly, securing the thimble permanently in place.

The advantages of my mode of constructing stove-pipe thimbles are, that they may be made very cheaply and highly ornamental, and can be put in so as to make a handsome finish on one or both sides of a partition, where it is necessary to pass a stove-pipe through, can be put in place and secured permanently, if desired. When the parts are put together they form a better insulated thimble than any other mode of construction. The protuberances on the inner, tin, zinc, or smooth bright sheet metal, which impinge against the stove-pipe, present so little surface that the smallest amount of heat possible is radiated or communicated to the thimble, and, with the openings in the caps, there will always be a free circulation of air, and no possibility of a sufficient heat to char or ignite a wood partition.

The utility of the invention has been fully established, and its merits are being fully appreciated, as thousands of them are being manufactured and sold in various parts of the country.

Having thus fully described my invention, what I claim as new, and desire to secure by Letters Patent, is—

1. A stove-pipe thimble consisting of the caps or heads A and B, having on their inner sides, respectively, flanges *a* and *b*, and of the connecting-cylinders C and D, the former having its ends fitting about the flanges *a* and *b*, and the latter having its ends turned over and clinched upon the faces of the openings in the heads, substantially as herein shown and described.

2. A stove-pipe thimble having a bright-surfaced inner cylinder, provided with protuberances, in the manner and for the purposes herein described.

In testimony whereof I hereunto subscribe my name.

THOMAS K. ANDERSON.

Witnesses:
EDM. F. BROWN,
J. B. WOODRUFF.